(12) United States Patent
Dinant et al.

(10) Patent No.: US 9,925,896 B2
(45) Date of Patent: Mar. 27, 2018

(54) INTERIOR SYSTEM FOR A VEHICLE, NAMELY ARMREST SYSTEM FOR A VEHICLE

(71) Applicants: Faurecia Interieur Industrie, Nanterre (FR); Faurecia Innenraum Systeme GmbH, Hagenbach (DE)

(72) Inventors: Bruno Dinant, Saint-Brice-Sous-Foret (FR); Joep Biljholt, Wissembourg (FR)

(73) Assignees: Faurecia Interieur Industrie, Nanterre (FR); Faurecia Innenraum Systeme GmbH, Hagenbach (DE)

( * ) Notice: Subject to any disclaimer, the term of this patent is extended or adjusted under 35 U.S.C. 154(b) by 0 days.

(21) Appl. No.: 14/863,773

(22) Filed: Sep. 24, 2015

(65) Prior Publication Data

US 2016/0090014 A1 Mar. 31, 2016

(30) Foreign Application Priority Data

Sep. 26, 2014 (FR) ..................................... 14 59141
Oct. 13, 2014 (DE) ........................ 10 2014 114 793

(51) Int. Cl.
*B60N 2/46* (2006.01)

(52) U.S. Cl.
CPC ........... *B60N 2/464* (2013.01); *B60N 2/4686* (2013.01)

(58) Field of Classification Search
CPC .... B60N 2/464; B60N 2/4633; B60N 2/4686; A47C 7/54
See application file for complete search history.

(56) References Cited

U.S. PATENT DOCUMENTS 4,244,623 A * 1/1981 Hall .......................... A47C 1/03
297/115
4,657,305 A * 4/1987 Meiller ................ B60N 2/4606
297/115

(Continued)

FOREIGN PATENT DOCUMENTS

DE 10032657 A1 1/2002
DE 102005012336 A1 9/2006

(Continued)

OTHER PUBLICATIONS

French Search Report for corresponding application No. 14 59141 dated May 22, 2015, 3 pages, not translated—in French.

(Continued)

*Primary Examiner* — Philip F Gabler
(74) *Attorney, Agent, or Firm* — Reising Ethington P.C.

(57) ABSTRACT

An interior system has a support and movable member mounted to be movable relative to the support for adjusting the height of the movable member, with a locking mechanism configured to allow unidirectional movement of the movable member relative to the support from a lowest adjustment position to a highest adjustment position. The interior system includes a deactivation mechanism for deactivating the locking mechanism and allowing the return of the movable member to the lowest adjustment position. The deactivation mechanism includes a track and a sliding member sliding along the track, with the sliding member and the track interacting to allow the locking mechanism to engage upon movement of the movable member from the lowest adjustment position to the highest adjustment position, and to disengage when the movable member exceeds the highest adjustment position and until it returns to the lowest adjustment position.

13 Claims, 7 Drawing Sheets

(56) References Cited

U.S. PATENT DOCUMENTS

| | | | |
|---|---|---|---|
| 4,828,323 A | 5/1989 | Brodersen et al. | |
| 4,881,424 A * | 11/1989 | Clark | B60N 2/468 297/411.36 |
| 5,951,107 A * | 9/1999 | Tornero | A47C 7/402 297/353 |
| 6,209,961 B1 * | 4/2001 | Chen | A47C 1/03 297/411.35 |
| 6,276,757 B1 * | 8/2001 | Brown | A47C 7/402 297/353 |
| 6,315,362 B1 * | 11/2001 | Chuang | A47C 1/03 297/411.36 |
| 6,439,664 B1 * | 8/2002 | Gorgi | A47C 1/03 297/353 |
| 6,676,212 B1 * | 1/2004 | Amirault | A47C 1/03 297/250.1 |
| 6,709,059 B1 * | 3/2004 | Cvek | A47C 7/402 297/353 |
| 6,851,754 B2 * | 2/2005 | Bremner | B60N 2/4646 297/411.36 |
| 7,188,901 B2 * | 3/2007 | Helmond | A47C 7/402 297/353 |
| 7,828,390 B2 * | 11/2010 | Liu | B60N 2/4606 297/411.36 |
| 2009/0091174 A1 * | 4/2009 | Diffrient | A47C 1/03 297/411.36 |

FOREIGN PATENT DOCUMENTS

| | | |
|---|---|---|
| DE | 102009048630 A1 | 4/2011 |
| EP | 0018662 A1 | 11/1980 |
| FR | 2841511 A1 | 1/2004 |
| FR | 2882306 A1 | 8/2006 |

OTHER PUBLICATIONS

Written Opinion for corresponding application No. 14 59141 dated May 22, 2015, 3 pages, not translated—in French.

* cited by examiner

INTERIOR SYSTEM FOR A VEHICLE, NAMELY ARMREST SYSTEM FOR A VEHICLE

FIELD OF THE INVENTION

The present invention relates to the field of armrest systems for a vehicle comprising an armrest that is adjustable in height in order to position it at an ergonomic height for the driver or a passenger.

The invention also relates to a vehicle console, in particular a motor vehicle central console with an armrest and/or a storage compartment and a latching assembly.

BACKGROUND

A variety of constructions for center consoles of vehicles, in particular motor vehicles, is known in the prior art. For example, DE 100 32 657 A1 discloses such a center console in a motor vehicle interior, whereby the center console has a lower storage compartment closable by a cover module. The cover module is pivotable about an axis extending in a direction lateral to the vehicle and is pivotable about an axis at its rear end and has an upper storage compartment arranged on the cover module. The storage compartment is coordinated with a cover of the cover module in the form of an armrest.

If, as in the example described above, a cover of the center console module is used as an armrest, it is advantageous if this armrest is adjustable in its orientation or in its position relative to the center console. In this way, for example, one can improve the comfort of a driver or passenger of the motor vehicle.

SUMMARY

One of the goals of the invention is to provide an armrest system with an adjustable armrest height using a simple adjustment mechanism, which is reliable and inexpensive to make.

Another of the goals of the invention is to provide a vehicle console with an armrest and/or a storage compartment, wherein the position of the armrest and/or storage compartment is adjustable relative to the vehicle console.

According to one aspect, the invention provides an armrest system for a vehicle, comprising a support, an armrest that is mounted to be movable relative to the support in order to allow height adjustment of the armrest, a one-way locking mechanism configured to allow movement of the armrest relative to the support from a lowest adjustment position to a highest adjustment position and to block the movement of the armrest in the opposite direction, wherein the locking mechanism comprises a first locking element and a second locking element which are movable with respect to one another and designed to engage with one another in order to block the armrest relative to the support and to disengage from one another in order to move from one adjustment position to the next adjustment position, and a deactivation mechanism to deactivate the locking mechanism and allow the return of the armrest to the lowest adjustment position, wherein the deactivation mechanism comprises a track and a sliding member travelling along the track, one being connected to the first locking element and the other being connected to the second locking element, wherein the sliding member and the track interact to allow the first locking element and second locking element to engage one another upon movement of the armrest from the lowest adjustment position to the highest adjustment position and to hold the first blocking element and the second locking element disengaged from one another when the armrest exceeds the highest adjustment position and until it returns to the lowest adjustment position.

The armrest system optionally includes one or more of the following features(s) individually or in all technically possible combinations:
- the sliding member travels along a first activation section of the track upon movement of the armrest from the lowest adjustment position to the highest adjustment position and along a second deactivation section of the track during the return of the armrest to the lowest adjustment position;
- the sliding member passes from the first section to the second section upon the armrest exceeding the highest adjustment position;
- the sliding member moves along the track in a closed loop;
- the track is provided with a non-return device allowing the passage of the sliding member in only one direction;
- the first locking element is carried by one of the armrests and the support while the second locking element is carried by the other;
- the first locking element is movably mounted on one of the armrests and the support which carries the first locking element while the second locking element is fixedly mounted on the other of the armrest and the support which carries the second locking element;
- the first locking element is carried by the armrest and the second locking element is carried by the support;
- the sliding member is carried by the first locking element and the track is connected to the second locking element;
- the track is carried by the support.

According to another aspect, the invention proposes a vehicle console, in particular a motor vehicle central console, provided with a storage compartment and a latching device is proposed, wherein the storage space is movably mounted with respect to the vehicle console. The latching device comprises at least a guide element, a guide channel and an elastic element. On the one hand, the elastic element is arranged on the vehicle console and, on the other, on the guide element. The guide channel is arranged on the storage compartment. In this case, the elastic element is designed to exert a force on the guide element in the direction of a guide surface of the guide channel, so that the guide element rests on the guide surface of the guide channel. The effective direction of the force exerted by the elastic element on the guide element can be switched from a first direction of action to a second direction of action.

The guide surface of the guide channel has at least two latching positions, wherein a stop stops the movement of the storage compartment in the first direction of action of the elastic element via the guide element and the guide channel. In the second direction of action of the elastic element, however, there is no stop for the movement of the storage compartment via the guide element and the guide channel.

Embodiments of the invention have the advantage that the movement of the storage compartment can be transferred from a latched position by means of the latching device into a released position by simply switching the direction of action of an elastic element, along which the storage compartment is freely movable in an adjustment direction. It may also include a plurality of latching positions, for example, the guide surface also has a number of latching positions which are so structured that the storage compartment with one armrest thereon can be latched at a number of different height settings, insofar as the elastic element is adjusted in the first direction of action.

Further, the vehicle console according to the invention can be advantageous because only an elastic element, a guide element and a guide surface are necessary for a latching device according to the invention. It should be noted that it would also be possible within the scope of the present invention to arrange the guide channel on the vehicle console and the elastic element on the storage compartment. The functionality of the latching device in itself would not be affected.

According to one embodiment of the invention, the guide surface of the guide channel is so designed that a movement of the storage compartment via a first dead center, changes the direction of action of the elastic element from the first to the second direction of action. Further, the guide surface according to the embodiment is further designed so that during a movement of the storage compartment through a second dead center, the direction of action of the elastic element changes from the second direction of action to the first direction of action.

Embodiments of the invention may have the advantage that no further components are required to change the direction of action of the elastic element. By a simple movement of the storage compartment, for example, via an adjustment range in the latched positions, the guide element can be moved to a released state in which it no longer engages in the latched positions, so that the storage compartment is freely movable with respect to the vehicle console. If the storage compartment is moved over the second dead center during the free movement of the storage compartment, the elastic element passes into its first direction of action, so that the guide element can again engage in the latching position of the guide channel, wherein the position of the storage compartment can again be fixedly defined with respect to the vehicle console.

According to a further embodiment, the latching device further comprises a lever, wherein the said lever connects the elastic element with the guide element. The lever is rotatably mounted about an axis of rotation on the vehicle console, wherein, in the first direction of action of the elastic element, the restoring force of the elastic element is directed at a first side of the axis of rotation, and wherein, in the second direction of action of the elastic element, the restoring force of the elastic element is directed at a second side of the axis of rotation.

Embodiments of the invention may have the advantage that in conjunction with an appropriate choice of the position of the axis of rotation with respect to the elastic element, the force exerted by the restoring force of the elastic element can be deflected by a deformation of the elastic element through the lever. In this way, for example, the pressing force applied to the guide element is directed approximately perpendicular to the guide surface of the guide channel. Thus, the pressing force of the guide element exerted by the elastic element on the guide surface can be optimised by a suitable choice of lever. At the same time, the change of the direction of action of the elastic element in connection with the choice of axis of rotation of the lever can be effected during a movement of the guide element over defined limits through a suitable design of the elastic element. This will be explained in more detail below.

According to a further embodiment, the elastic element is a torsion spring, wherein the torsion spring is arranged at a first end to the guide element and at a second end to the vehicle console. The use of a torsion spring as an elastic element may have the advantage that torsion springs generally represent a very reliable and simultaneously cost-effective elastic element.

According to a further embodiment, the guide channel further comprises a guide wall, wherein the said guide wall is at a distance of at least the thickness of the guide element from the guide surface of the guide channel. The guide wall is so designed to pass around the guide element to the latching position of the guide surface according to the direction of movement of the storage compartment following reversal of the direction of action of the elastic element from the first direction of action to the second direction of action.

Embodiments of the invention may have the advantage that a springing back of the guide element by a sudden change of direction of action of the elastic element from the said second direction of action to the first direction of action is prevented by the guide wall. This is particularly advantageous if, for example, the latching positions of the guide channel are all arranged in a series on one side of the guide channel and that after changing from the first direction of action to the second direction of action, the guide element is led to the latching positions around the opposite side of the guide channel along the guide surface. If during the movement of the guide element from, for example, a lower to an upper position, the direction of action of the elastic element suddenly changes and the guide element falls back into one of the latching positions. In this way, the return process cannot be completed. This problem can be effectively prevented by a guide wall in the guide channel, which is so designed that the guide element can no longer spring back into the latching position as long as a return process is effected.

According to a further embodiment, the latching positions are elevations in the guide surface. The elevations are adapted to positively receive the guide element, provided that the elastic element acts in the direction of the first direction of action.

Embodiments of the invention may have the advantage that such a design of the latching positions can be easily implemented, for example, during a milling process. Thus, for example, the manufacturing effort for the production of a guide channel can be simplified.

According to a further embodiment, the guide channel is designed as a recess in the storage compartment. For example, a wall of the storage compartment can be designed sufficiently thick so that the guide channel can be milled into the wall of the storage compartment, for example by a milling-out process. In this way, one can avoid producing the guide channel as a separate part, which would then have to be fixed on the storage compartment, for example by means of screws or adhesive bonding. Accordingly, the durability of the latching device can be significantly improved by the one-piece design of the storage compartment and guide channel together, while, at the same time, the manufacture of the latching device is simplified.

According to an embodiment of the invention, the guide channel has a first slope, wherein the effective direction of action of the elastic element changes from the first direction of action to the second direction of action when the guide element is guided via the first slope.

Embodiments of the invention may have the advantage that changing the direction of action of the elastic element in a simple manner may be effected through a slope on the guide surface of the guide channel.

According to an embodiment of the invention, the storage compartment is mounted to be movable only along a predefined trajectory with respect to the vehicle console. This could, for example, significantly simplify the design of the guide channel and the positioning of the latching positions, because it is clear from the outset how the positions of the vehicle console and storage compartment will change with respect to one another during an adjustment process.

According to a further embodiment, the storage compartment can be closed by a cover, wherein the cover is pivotably mounted on the storage compartment.

The two aspects of the invention described here above also apply in a more general manner to a vehicle interior system instead of a armrest system or a central console, the movable armrest or storage compartment of the armrest system or central console being replaced by a movable member mounted to be movable relative to the support for adjusting the height of the movable member.

According to a further aspect, the invention relates to a vehicle interior system, comprising a support, a movable member mounted to be movable relative to the support for adjusting the height of the movable member, a locking element operable to lock the movable member in a plurality of adjustment positions with respect to the support, and a guide track having a locking path and a free return path, wherein the locking member cooperates cyclically with the locking path and the free return path when moving the movable member with respect to the support, the locking member locking the movable member with respect to the support successively in the plurality of adjustment positions when cooperating with the locking path and allowing the free return of to the movable member without locking the movable member in the adjustment positions when cooperating with the free return path. The movable member is e.g. an armrest or a storage compartment. The storage compartment may comprise an armrest covering the storage compartment.

BRIEF DESCRIPTION OF THE DRAWINGS

The invention and its advantages will be better understood on reading the description which follows, but that is given solely by way of example and with reference to the accompanying drawings in which.

DETAILED DESCRIPTION OF ILLUSTRATED EMBODIMENT

Figure 1:
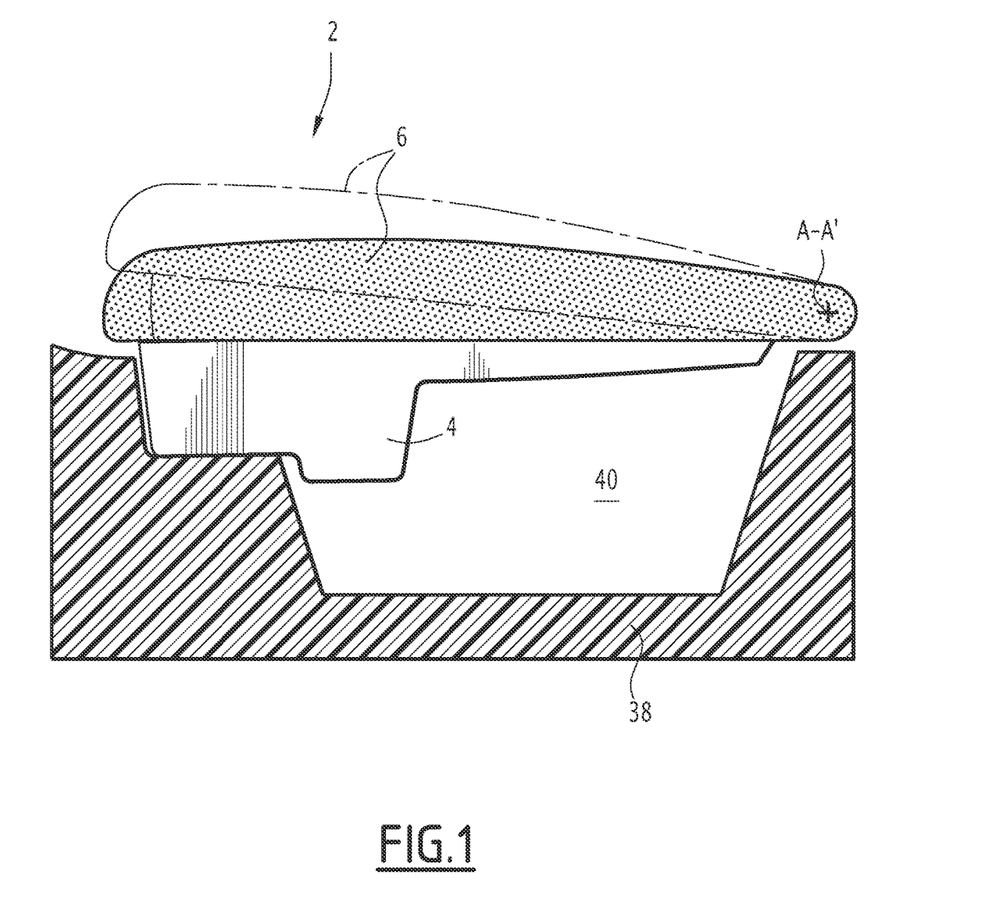
FIG. 1 is a schematic side view of an armrest system comprising a height adjustable armrest illustrated in different positions.

The armrest system 2 illustrated in FIG. 1 comprises a support 4 and an armrest 6 movably mounted on a support 4 in order to adjust the height of the armrest 6. The armrest 6 is movable relative to the support 4 following an adjustment movement.

In this case, the armrest 6 is mounted to pivot relative to the support 4 around an axis A-A'. The adjustment movement is a rotational movement about the axis A-A'. The axis A-A' is substantially horizontal.

The rotation of the arm 6 about the axis A-A' tilts the armrest 6 relative to the support 4 in order to raise the region of the armrest 6 remote from the axis A-A'. The height adjustment of the armrest 6 allows more precise adjustment of the height of the region of the armrest 6 from the axis A-A'. This region is the one on which the user places his elbow.

The armrest system 6 comprises an adjustment mechanism configured to allow positioning of the armrest 6 in a plurality of adjustment positions relative to the support 4.

The adjustment mechanism is configured for the positioning of the armrest 6 in a lowest adjustment position (solid lines in FIG. 1) and in a highest adjustment position (chain-dotted line in FIG. 1).

Preferably, the adjustment mechanism is configured for the positioning of the armrest 6 in at least one intermediate adjustment position between the lowest adjustment position and the highest adjustment position.

As illustrated in FIGS. 2 to 5, the adjustment mechanism 8 comprises a one-way locking mechanism 10 configured, when active, to allow the displacement of the arm 6 relative to the support 4 only from the bottom upwards, from the lowest adjustment position to the highest adjustment position, and to prevent movement of the armrest 6 from top to bottom in the opposite direction.

To raise the armrest 6, the user lifts the armrest 6 to the desired height, which is allowed by the locking mechanism 10, and then releases the armrest 6 which remains locked at the desired height by the locking mechanism 10.

The locking mechanism 10 allows the movement of the armrest 6 incrementally. Each increment corresponds to a respective adjustment position. The armrest 6 therefore remains locked in the adjustment position immediately below the height reached.

The locking mechanism 10 comprises a first locking element 12 and a second locking element 14 capable of engaging with one another to lock the arm 6 relative to the support 4.

The first locking element 12 and the second locking element 14 are carried one by the armrest 6 and the other by the support 4. One of the first locking elements 12 and the second locking elements 14 is movable relative to that of the armrest 6 and the support 4 which carries it.

In this case, the first locking element 12 is mounted rotatably around an axis B-B' on the armrest 6 while the second locking element 14 is fixedly mounted on the support 4. The first locking element 12 is a lever and the second locking element 14 is an abutment.

The locking mechanism 10 includes a resilient return member 16 to bias the first locking element 12 to engage the second locking element 14. The resilient return member 16 is permanently active. In this case, the resilient return member 16 is a torsion spring.

The first locking element 12 and the second locking element 14 have teeth 18, 20 respectively, with which they engage one another.

The teeth 18, 20 have sliding surfaces 18A, 20A that are in contact during the movement of the armrest 6 from the bottom upwards, and locking faces 18B, 20B that are in contact when the armrest 6 is biased from top to bottom.

The sliding surfaces 18A, 20A are inclined so that they tend to disengage the first locking element 12 and the second locking element 14 from one another in order to allow the movement of the armrest 6 from the bottom upwards.

The locking surfaces 18B, 20B are inclined in such a manner that the first locking element 12 and the second locking element 14 engage with one another when the armrest 6 is biased from the top downwards.

In this case, the first locking element 12 has a plurality of teeth and the second locking element 14 has a single tooth. Alternatively, the first locking element 12 may have one or more teeth and the second locking element 14 may have a plurality of teeth.

Figure 2:
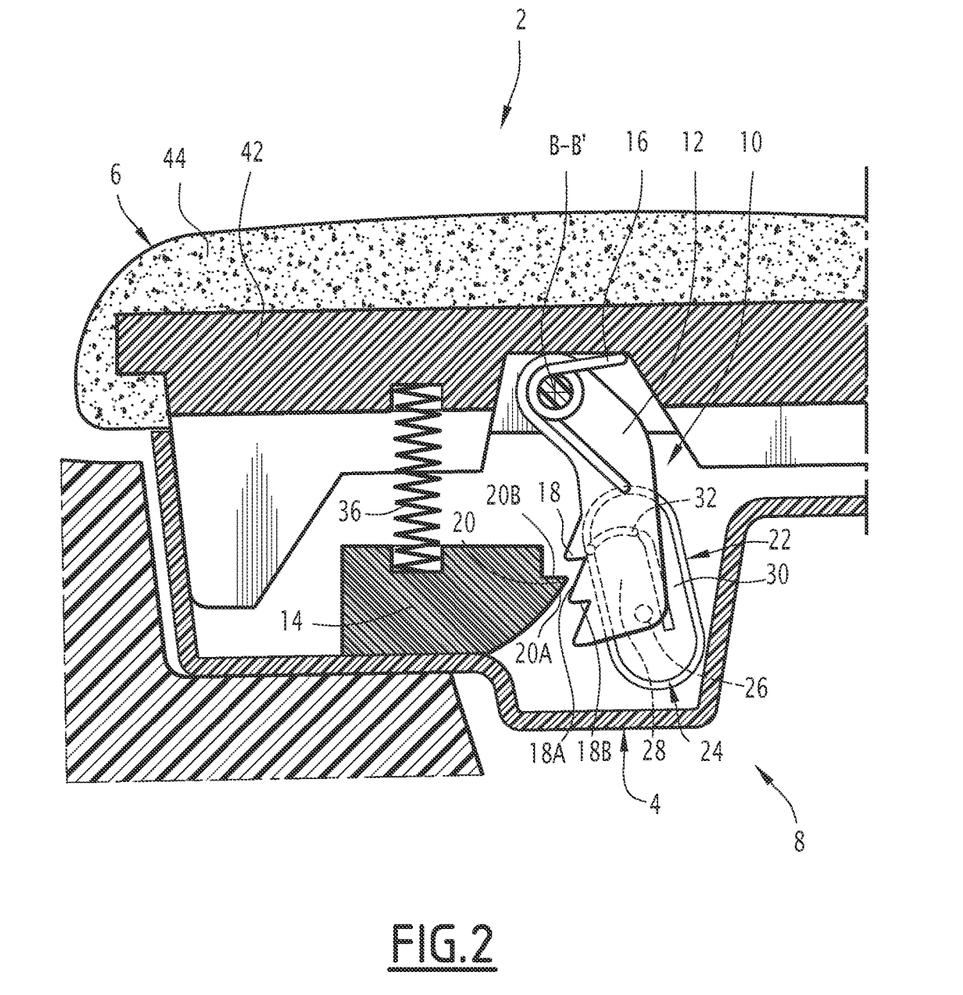
FIGS. 2 to 5 are partial views of the armrest system in section showing a height adjustment mechanism of the armrest 6 in different positions of the armrest.
Figure 3:
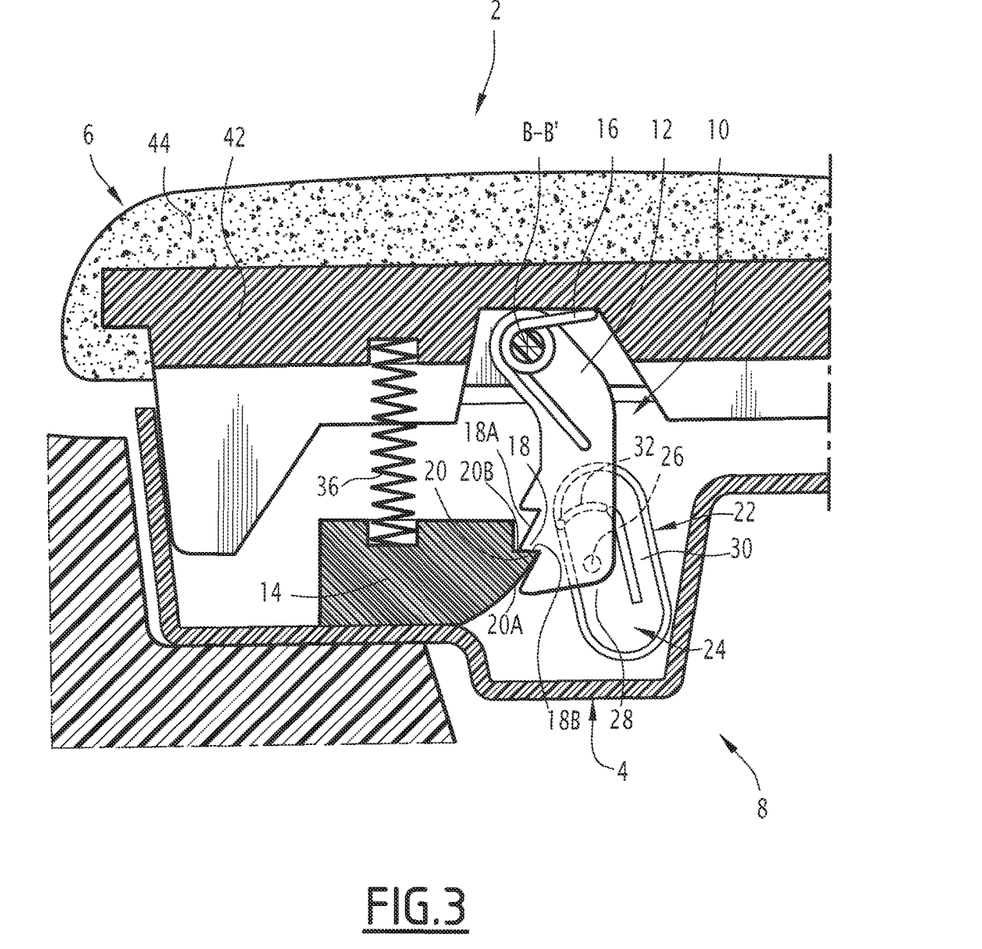
Figure 4:
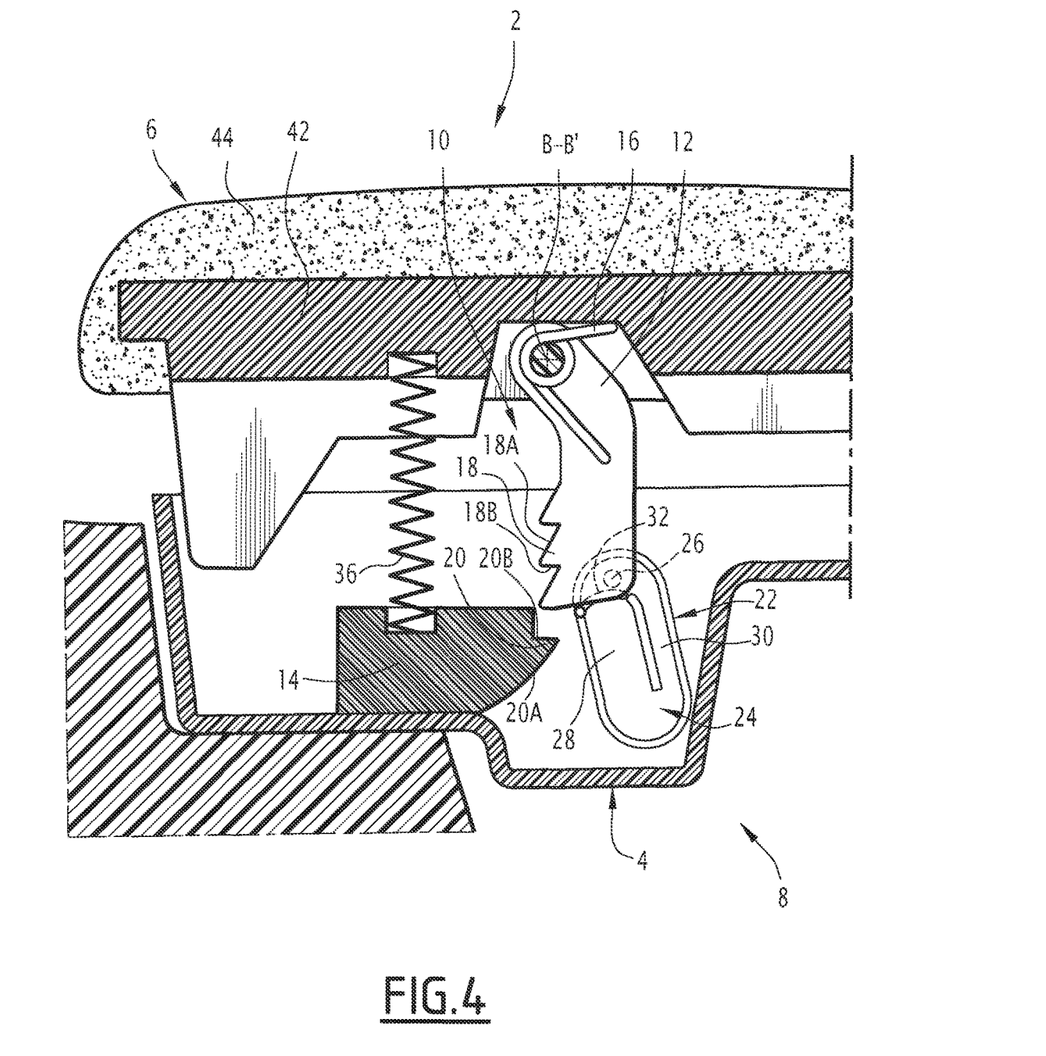

As shown in FIGS. 2 to 4, the one-way locking mechanism 10 operates in the manner of a ratchet mechanism. The first locking element 12 and the second locking element 14 automatically disengage from one another when the armrest 6 is moved from the bottom upwards, while remaining engaged to lock the armrest 6 when the armrest 6 is biased from top to bottom.

The adjustable armrest 6 assembly comprises a deactivation mechanism 22 configured to hold the locking mechanism 10 deactivated when the armrest 6 exceeds the highest adjustment position and until it returns to the lowest adjustment position.

The deactivation mechanism 22 is configured to deactivate the locking mechanism 10 while holding the first locking element 12 and the second locking element 14 disengaged from one another to permit the movement of the armrest 6 from the top downwards.

The deactivation mechanism 22 is configured to deactivate the locking mechanism 10 by the movement of the armrest 6.

The deactivation mechanism 22 is configured to reactivate the locking mechanism 10 once the armrest 6 returns to the lowest adjustment position.

The deactivation mechanism 22 includes a track 24 and a sliding member 26 moving or sliding along the track 24 by the movement of the armrest 6.

The track 24 is, for example, in the form of a groove or a slot into which the sliding member 26 is inserted and slides.

The track 24 defines a closed path that is travelled cyclically in a closed loop by the sliding member 26.

The track 24 comprises a first activation section 28 and a second separate deactivation section 30. The sliding member 26 moves along the activation section 28 and then the deactivation section 30 cyclically due to the movement of the armrest 6.

When the sliding member 26 is in the activation section 28, the track 24 and the sliding member 26 interact to allow the first locking element 12 and the second locking element 14 to engage one another.

When the sliding member 26 is in the deactivation section 30, the track 24 and the sliding member 26 interact to keep the first locking element 12 and the second locking element 14 disengaged from one another, so that they are not engaged with one another on contacting the return member 16.

The track 24 is configured so that when the armrest 6 exceeds the highest adjustment position from the bottom upwards, the sliding member 26 passes from the activation section 28 to the deactivation section 30.

The track 24 is configured so that when the armrest 6 reaches the lowest adjustment position, the sliding member 26 returns from the deactivation section 30 to the activation section 28.

The sliding member 26 is carried by the first locking element 12. The sliding member 26 is arranged on the first locking element 12 remote from the axis of rotation B-B' thereof.

The track 24 is carried by the support 4.

The activation section 28 has a width sufficient to allow the deflection of the first locking element 12 so that the first locking element 12 can disengage temporarily from the second locking element 14 during the passage from one adjustment position to the next during the movement of the armrest 6 from the bottom upwards.

Figure 6:
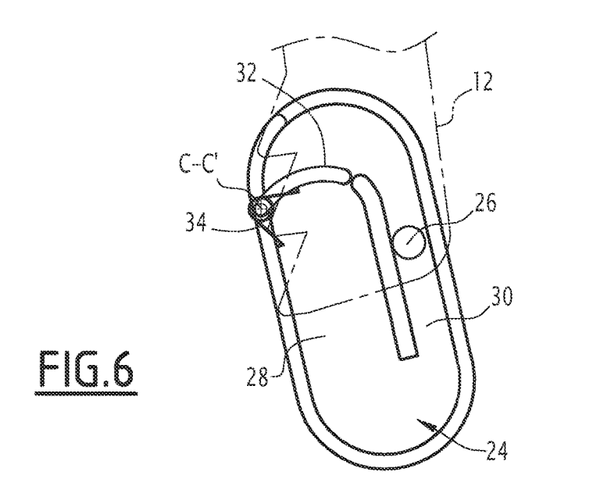
FIG. 6 is a detail view of FIG. 5.

As illustrated in FIG. 6, the deactivation mechanism 22 includes a non-return member 32 arranged along the track 24 to allow the passage of the sliding member 26 in one direction and prevent the passage of the sliding member 26 in the other direction.

The non-return member 32 is so arranged that the sliding member 26 passes the non-return member 32 when the armrest 6 exceeds the highest adjustment position.

The non-return member 32 ensures that the sliding member 26 passes from the activation section 28 to the deactivation section 30 when the armrest 6 exceeds the highest adjustment position, by preventing the sliding member 26 reengaging in the activation section 28.

The non-return member 32 is pivotally mounted about an axis C-C' between a deployed position in which it extends across the track 24 and a retracted position in which it is disengaged from the track 24.

The non-return member 32 is drawn into the deployed position by a resilient return member 34.

The non-return member 32 is configured to be retracted under the effect of the sliding member 26 when the sliding member 26 moves in the permitted passage direction and to block the sliding member 26 when the latter moves in the opposite direction.

As illustrated in FIGS. 2 to 5, the armrest system 6 optionally includes a resilient return member 36 arranged to bias the armrest 6 towards the lowest adjustment position. This resilient return member 36 prevents, for example, the armrest 6 being unintentionally raised from one adjustment position to the next adjustment position. The armrest 6 is biased toward the lowest adjustment position by its own weight and by the biasing member.

In operation, the armrest 6 is initially at the lowest adjustment position (FIG. 2). The sliding member 26 is in the activation section 28. The user lifts the armrest 6 to move to the next adjustment position (FIG. 3). During this movement, the first locking element 12 disengages from the second locking element 14 on contacting the biasing member because of the inclination of the sliding faces, and then re-engages with the second locking element when the next adjustment position is reached. The width of the activation section 28 allows the slider 26 to accompany the movement of the first locking element without hindering it.

The user raises the arm 6 to pass successively through all the intended adjustment positions, from the lowest adjustment position to the highest adjustment position.

Once the highest adjustment position is reached, and in order to return to the lowest adjustment position, the user lifts the armrest 6 beyond the highest adjustment position (FIG. 4). The sliding member 26 passes the non-return member 32 and then engages in the deactivation section 30. The sliding member 26 engaged in the deactivation section 30 holds the first locking element 12 disengaged from the second locking element 14 on contacting the return member 16.

Figure 5:
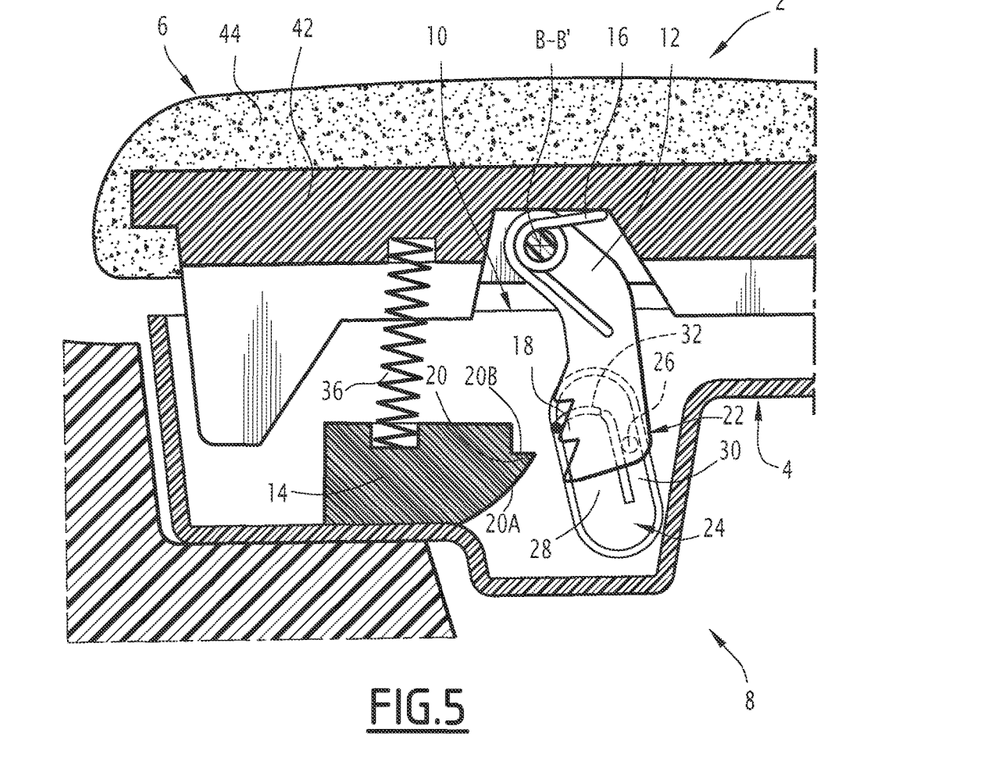

The user re-lowers the armrest 6 which passes freely and directly from the highest locking position to the lowest locking position without being locked in the other locking positions (FIG. 5). Once the armrest 6 again reaches the lowest adjustment position, the sliding member 26 returns to the activation section 28 (FIG. 2).

The adjustment mechanism is simple, reliable, and inexpensive. In particular, the adjustment mechanism is made of a reduced number of parts, of simple shape and with simple connections between the various parts.

The invention is not limited to the embodiment of FIGS. 2 to 6. Variants are possible.

In the embodiment illustrated, the first locking element 12 is carried by the armrest 6 and the second locking element 14 is carried by the support 4. A reverse configuration is possible wherein the first locking element 12 is carried by the support 4 and the second locking element 14 is carried by the armrest 6.

Furthermore, in the embodiment illustrated, the first locking element 12 is rotatably mounted. Alternatively, the first locking element 12 may be slidably mounted in order to engage or disengage the second locking element 14. Such a sliding movement is possible in a configuration where the first locking element 12 is carried by the armrest 6 and the second locking element 14 is carried by the support 4, as well as in a configuration where the first locking element is carried by the support 4 and the second locking element 14 is carried by the armrest 6.

In the embodiment illustrated, the armrest 6 is rotatably mounted relative to the support 4. Alternatively, the armrest 6 may be slidably mounted relative to the support 4 along a sliding axis, preferably substantially vertical. The various variants envisaged for the adjustment mechanism are applied in the same manner.

As illustrated in FIG. 1, the armrest system 6 closes a storage box 38, which is, for example, positioned between the front seats of the vehicle. The storage box 38 defines a storage space 40. The armrest system 6 forms a lid for the storage box 38. The support 4 of the armrest system 6 is itself pivotally mounted on the storage box 38 in such a way as to lift the armrest system 6 as a whole and to produce an access opening to the interior of the storage box 38. Alternatively, the armrest system 6 does not close the storage box.

It should be noted that in the embodiment illustrated, the armrest 6 has a frame 42 and a trim 44 covering the frame (2 to 5).

Figure 7:
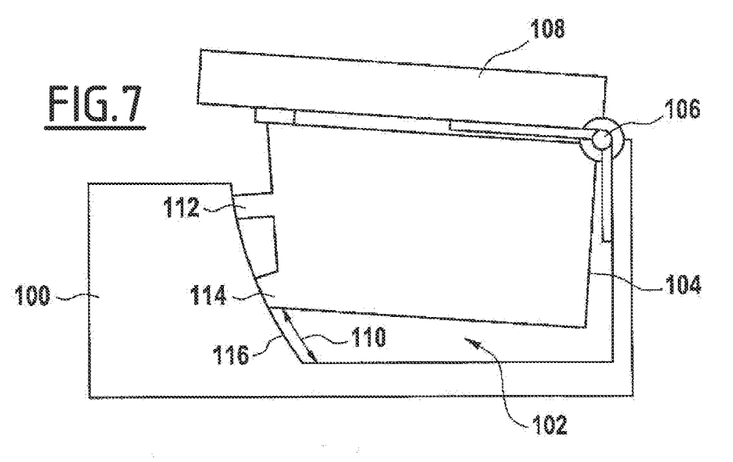
FIG. 7 shows a schematic view of a vehicle console with a storage compartment and an armrest mounted therein.

FIG. 7 shows a schematic representation of a vehicle console 100, wherein the vehicle console 100 has a recess 102. A storage compartment 104 is arranged within the recess 102, and is pivotably mounted on a hinge 106 about the rotation of axis of the hinge 106. The interior of the storage compartment 104 is further closable by a cover 108, wherein the said cover 108 is also pivotably mounted on the hinge 106. For example, the cover can be configured as an armrest 108 of a motor vehicle.

Upon pivotal movement of the storage compartment 104 as indicated by the arrow 110, the guide elements 112, 114 slide along a surface 116 of the center console 100, wherein the pivotal movement of the storage compartment 104 is guided, on the one hand, by the axis of rotation of the hinge 106 and, on the other, by the guide elements 112, 114 and the surface 116.

Particularly in the case of a use of the cover 108 as an armrest in a motor vehicle, it may be necessary for the orientation of the cover 108 to be latched in various positions. The latching device for positioning the cover 108 must be configured to compensate for a force acting, for example, through the support of a passenger of the motor vehicle on the armrest or cover 108. For this purpose, a latching device is described below, which can guarantee this latching alignment of the cover 108 and thus also of the storage compartment 104.

Figure 8:
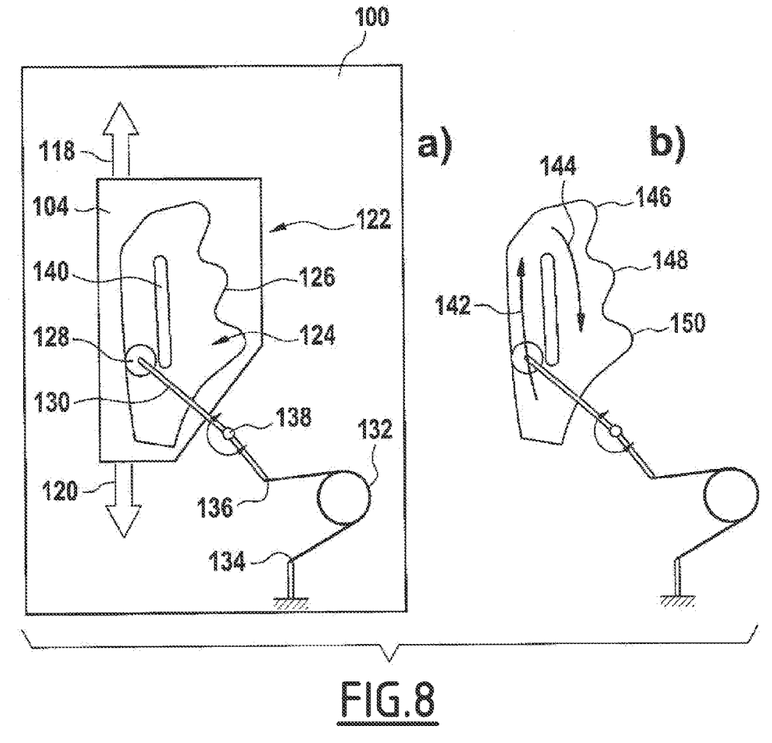
FIG. 8 shows a schematic representation of a latching device according to the invention.

FIG. 8*a*) shows a schematic representation of a combination of the vehicle console 100 and the storage compartment 104, whereby movement of the storage compartment 104 with respect to the vehicle console, as indicated by the arrows 118 and 120, actuates a latching mechanism 122. The latching mechanism 122 consists essentially of a guide channel 124, which is delimited by a guide surface 126, as well as a guide element 128, a lever 130 and a torsion spring 132, acting as an elastic element. The torsion spring 132 is fixedly connected at one end 134 to the vehicle console 100 and at the other end 136 to the lever 130. The lever 130 is, in turn, rotatably mounted at a pivot point 138. The guide element 128 is arranged at the end of the lever 130 facing away from the torsion spring 132. In addition, there is a partition wall 140 whose function within the guide channel 124 is described below.

As shown schematically in FIG. 8*b*), two paths for the guide element during movement of the storage compartment 104 with respect to the vehicle console 100 result from the arrangement of the torsion spring 132, lever 130 and guide element 128. On the one hand, the guide element 128 is directed along a resetting path 142 upon a relative movement of the storage compartment 104, while, on the other, the guide element 128 is directed along a latching path 144 with respect to the vehicle console 100. During a movement of the guide element 128 along the latching path 144, the guide element is pushed into latching positions 146, 148 and 150 in the guide surface 126 under the effect of the restoring force of the elastic element 132 via the lever 130. In this case, the latching positions 146, 148 and 150 are designed as elevations in the guide surface 126. Once the elastic element 132 is in one of the latching positions, the storage compartment 104 cannot be shifted downwards as, in this case, the guide surface 126 is supported on the guide element 128, and, therefore, the storage compartment 104 forms a stop for the downwards movement.

Upon movement of the storage compartment 104 upwards, the guide element 128 is latched successively into the latching positions 146, 148 and 150. The adjustment region is defined as the vertical position at which the storage compartment can be set 104. If the storage compartment 104 is moved upwards through this adjustment region, the guide element passes into a released state wherein it follows the resetting path 142, so that the storage compartment 104 can be moved back down and again pass along the latching path 144. This will be explained below in more detail with reference to FIG. 9.

Figure 9:
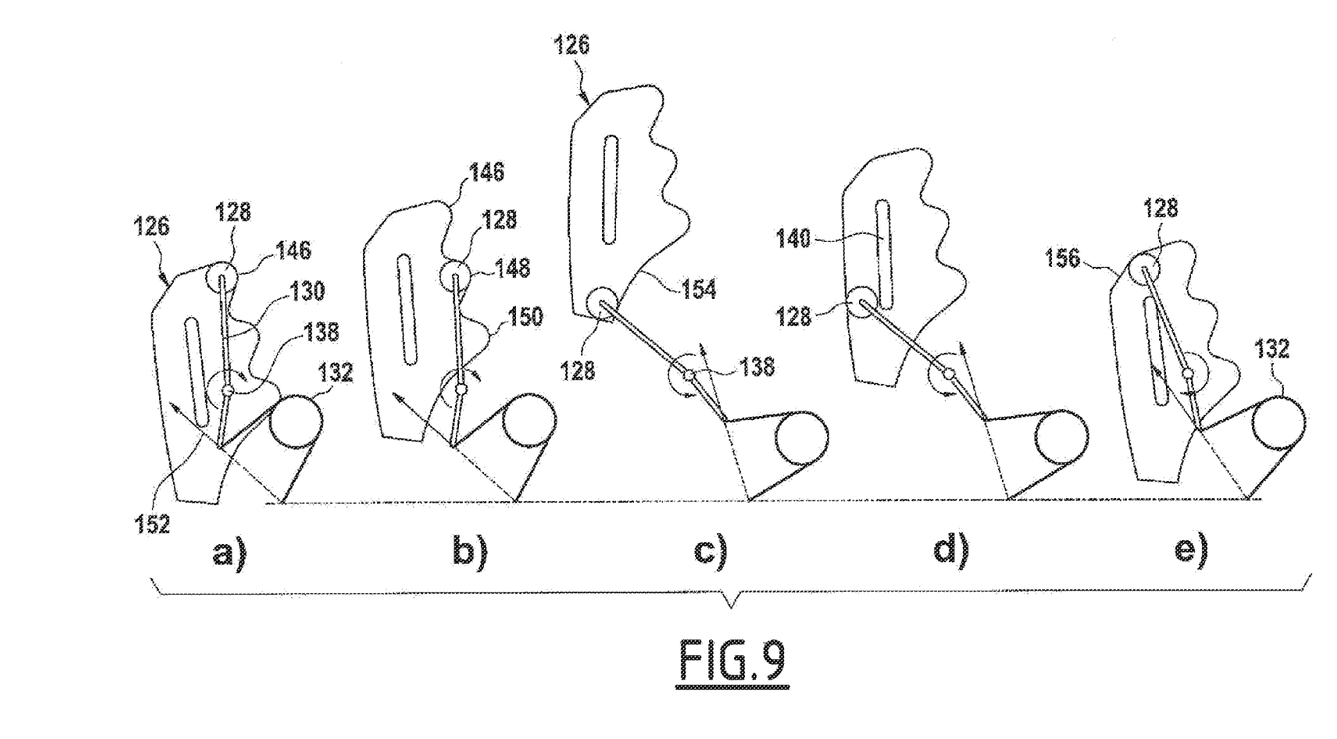
FIG. 9 shows schematic representations of various stages of a latching process or a resetting process.

FIG. 9*a*) shows a diagrammatic representation of the latching device in a starting position, wherein the storage compartment 104, on which the locking device is arranged, is stored at its lowest position. The guide element 128 abuts the guide surface 126 in the top latching position 146. By deformation of the torsion spring 132, the torsion spring 132 applies a restoring moment and thus a linear force, indicated by arrow 152, to the lower end of the lever 130. Since the direction of the restoring force 152 is directed to the left of the pivot point 138, the restoring force 152 causes torque to be applied to the lever 130 to the right about the pivot point 138. The resulting force on the guide element 128 presses the guide element 128 to the right against the guide surface 126 in the upper latching position 146.

FIG. 9b) now shows the situation which arises when the storage compartment 104 is moved upwards with respect to the vehicle console 100. The guide element 128 slides downwards along the guide surface 126 and jumps to the next latching position 148 as a result of a movement due to the restoring force of the elastic element 132 acting on the guide element 128, wherein the storage compartment 104 is latched in a higher position because the force acting from above on top of the storage compartment 104 is compensated by the stop formed by the guide element 128 and the guide surface 148. In addition, upon further movement of the storage compartment 104 upwards, the guide element may engage in the third latching position 150. The adjustment region of the storage compartment 104 is thus defined through the three latching positions 146, 148 and 150. In order to allow a renewed alignment of the storage compartment 104 after passing through the adjustment region, the latching device 122 must first pass through a released state, starting from the lowest latching position 150.

For this purpose, the storage compartment 104 is moved upwards over the adjustment region of the latching mechanism as shown in FIG. 9c). The guide element 128 slides down a slope 154 of the guide surface 126. In this case, the profile of the slope 154 is so selected that the direction of the restoring force exerted by the torsion spring 132 upon sliding of the guide element 128 along the slope due to an upwards movement of the storage compartment 104 with respect to the previously described situation is on another side of the pivot point 138, on the right side in the case illustrated. This simultaneously changes the force exerted on the guide element 128 from a first direction of action to a second direction of action. In the first direction of action, the guide element 128 is pressed by the torsion spring 132 to the right. However, once the guide element 128 is guided along the slope 154 and thereby changes the direction of action of the restoring moment of the torsion spring to another side of the pivot point 138, the force now acts to the left of the guide element 128.

If now, as shown in FIG. 9d), the storage compartment 104 is moved downwards again, the guide element 128 no longer moves to the right to the latching positions 146, 148 and 150, but slides upwards along the left wall of the guide channel 124. The partition wall 140 is provided in the guide channel, whereby springing back of the guide element 128 to the right is prevented during the resetting operation. Once the guide element 128 is moved downwards far enough due to movement of the storage compartment 104 and upwards within the guide channel 124, it again contacts a slope 156, which deflects the movement of the guide element 128 to the right. Thereby, the effective direction of the restoring force of the torsion spring 132 is simultaneously moved back to the other side of the pivot point 138, so that now a force is again applied to the right of the guide element 128 by the torsion spring 132 via the lever 130. This guide element 128 may again engage in the latching positions 146, 148 and 150 upon a renewed movement of the storage compartment 104 upwards. Thus, the adjustment procedure can be started again in the situation shown in FIG. 9a).

The latching mechanism described is not limited to a linear adjustment of a storage compartment or any other element. Rather, the latching mechanism could be applied without further ado for a rotational alignment of a component.

The invention is not limited to a front central armrest system of a vehicle, but is generally applicable to the armrest system 6 of any vehicle.

Even more generally, the invention applies to any vehicle interior system comprising a support and a movable member (e.g. an armrest or a storage compartment) movably mounted on the support for adjusting the height of the movable member relative to the support.

The invention claimed is:

1. An interior system for a motor vehicle, comprising
a support,
a movable member mounted to be movable relative to the support for adjusting the height of the movable member,
a locking mechanism configured to allow unidirectional movement of the movable member relative to the support from a lowest adjustment position to a highest adjustment position and to block movement of the movable member in the opposite direction, wherein the locking mechanism comprises a first locking element and a second locking element that are movable relative to one another and are arranged to engage with one another to block the movable member relative to the support and to disengage from one another in order to move from one adjustment position to the next adjustment position; and
a deactivation mechanism for deactivating the locking mechanism and allow the return of the movable member to the lowest adjustment position, wherein the deactivation mechanism includes a track and a sliding member sliding along the track, one of said track and sliding member being connected to the first locking element and the other of said track and sliding member being connected to the second locking element, wherein the sliding member and the track interact to allow the first locking element and the second locking element to engage with one another upon movement of the movable member from the lowest adjustment position to the highest adjustment position, and to keep the first locking element and the second locking element disengaged from one another when the movable member exceeds the highest adjustment position and until it returns to the lowest adjustment position,
wherein the first locking element is mounted movably on one of the support or the movable member and biased by a resilient return member toward engagement with the second locking element when the locking mechanism is activated and when the locking mechanism is deactivated.

2. The interior system according to claim 1, wherein the sliding member moves along a first activation section of the track upon movement of the movable member from the lowest adjustment position to the highest adjustment position and moves along a second deactivation section of the track during the return of the movable member to the lowest adjustment position.

3. The interior system according to claim 2, wherein the sliding member passes from the first section to the second section upon the movable member exceeding the highest adjustment position.

4. The interior system according to claim 1, wherein the sliding member moves along the track in a closed loop.

5. The interior system according to claim 1, wherein the track is provided with a non-return device allowing the passage of the sliding member in one direction.

6. The interior system according to claim 1, wherein the first locking element is carried by either the movable member and the support and the second locking element is carried by the other.

7. The interior system according to claim 6, wherein the first locking element is movably mounted on that of the movable member and the support which carries the first locking element while the second locking element is fixedly mounted on the other of the movable member and the support which carries the second locking element.

8. The interior system according to claim 6, wherein the first locking element is carried by the movable member and the second locking element is carried by the support.

9. The interior system according to claim 1, wherein the sliding member is carried by the first locking element and the track is connected to the second locking element.

10. The interior system according to claim 1, wherein the track is carried by the support.

11. The interior system according to claim 1, the interior system being an armrest system and the movable member being an armrest.

12. An interior system for a motor vehicle, comprising
a support,
a movable member mounted to be movable relative to the support for adjusting the height of the movable member,
a locking element operable to lock the movable member in a plurality of adjustment positions with respect to the support, and
a guide track having a locking path and a free return path,
wherein the locking element cooperates cyclically with the locking path and the free return path when moving the movable member with respect to the support,
wherein the locking element locks the movable member with respect to the support successively in the plurality of adjustment positions when cooperating with the locking path and allows the free return of to the movable member without locking the movable member in the adjustment positions when cooperating with the free return path, and
wherein the locking element is mounted movably on one of the support or the movable member and biased by a resilient return member toward engagement with a second locking element when cooperating with the locking path and when cooperating with the free return path.

13. The interior system according to claim 1, wherein the deactivation mechanism comprises a non-return member extending across the track, the non-return member being moveable to allow passage of the sliding member from an activation section of the track to a deactivation section of the track and prevent passage of the sliding member from the deactivation section of the track to the activation section of the track.

* * * * *